United States Patent
Razack

(10) Patent No.: US 11,152,626 B2
(45) Date of Patent: Oct. 19, 2021

(54) FUEL CELL COMPONENT HAVING MULTIPLE PORE SIZES

(71) Applicant: AUDI AG, Ingolstadt (DE)

(72) Inventor: Siddique Ali Khateeb Razack, Darien, IL (US)

(73) Assignee: Audi AG, Ingolstadt (DE)

( * ) Notice: Subject to any disclaimer, the term of this patent is extended or adjusted under 35 U.S.C. 154(b) by 48 days.

(21) Appl. No.: 15/111,151

(22) PCT Filed: Jan. 16, 2014

(86) PCT No.: PCT/US2014/011806
§ 371 (c)(1),
(2) Date: Jul. 12, 2016

(87) PCT Pub. No.: WO2015/108518
PCT Pub. Date: Jul. 23, 2015

(65) Prior Publication Data
US 2016/0336601 A1    Nov. 17, 2016

(51) Int. Cl.
*H01M 8/0245* (2016.01)
*H01M 8/0234* (2016.01)
*H01M 4/88* (2006.01)
*H01M 4/86* (2006.01)
*H01M 8/1018* (2016.01)

(52) U.S. Cl.
CPC ......... *H01M 8/0245* (2013.01); *H01M 4/861* (2013.01); *H01M 4/8663* (2013.01); *H01M 4/8807* (2013.01); *H01M 8/0234* (2013.01); *H01M 4/8817* (2013.01); *H01M 2008/1095* (2013.01)

(58) Field of Classification Search
CPC ......... H01M 4/86–8615; H01M 4/8626–8631; H01M 4/8647–8657; H01M 8/023; H01M 8/0234; H01M 8/0239–0245
See application file for complete search history.

(56) References Cited

U.S. PATENT DOCUMENTS

| | | | |
|---|---|---|---|
| 5,176,947 A | | 1/1993 | Afzali-Ardakani et al. |
| 5,350,643 A | * | 9/1994 | Imahashi ............ H01M 8/1004 429/481 |
| 5,620,807 A | * | 4/1997 | Mussell ................ H01M 4/926 429/514 |
| 5,712,062 A | * | 1/1998 | Yamana ................ C04B 41/009 106/2 |
| 6,733,915 B2 | | 5/2004 | Barton et al. |
| 2003/0064279 A1 | * | 4/2003 | Yoshida .............. H01M 4/8605 429/481 |

(Continued)

FOREIGN PATENT DOCUMENTS

| | | |
|---|---|---|
| CA | 2 380 380 C | 10/2002 |
| EP | 2 680 352 A2 | 1/2014 |
| KR | 10-2008-0047765 A | 5/2008 |

*Primary Examiner* — Jonathan Crepeau
*Assistant Examiner* — Jacob Buchanan
(74) *Attorney, Agent, or Firm* — Seed IP Law Group LLP

(57) ABSTRACT

An illustrative fuel cell component includes a body that has a plurality of first pores. The first pores have a first pore size. A fluorinated carbon coating is on at least some of the body. The coating establishes a plurality of second pores in a coated portion of the body. The second pores have a second pore size that is smaller than the first pore size.

12 Claims, 2 Drawing Sheets

(56) References Cited

U.S. PATENT DOCUMENTS

| | | | |
|---|---|---|---|
| 2003/0077503 A1* | 4/2003 | Yoshitake | C08J 5/2281 |
| | | | 502/101 |
| 2003/0157397 A1* | 8/2003 | Barton | H01M 4/8605 |
| | | | 429/481 |
| 2007/0154777 A1* | 7/2007 | Akiyama | H01M 4/8668 |
| | | | 429/209 |
| 2009/0148726 A1 | 6/2009 | Ji et al. | |
| 2009/0148739 A1* | 6/2009 | Akasaka | H01M 8/0239 |
| | | | 429/410 |
| 2011/0008706 A1* | 1/2011 | Cipollini | H01M 4/8605 |
| | | | 429/483 |
| 2011/0136044 A1 | 6/2011 | Han et al. | |
| 2014/0011118 A1* | 1/2014 | Lee | D21H 13/50 |
| | | | 429/534 |

* cited by examiner

FUEL CELL COMPONENT HAVING MULTIPLE PORE SIZES

BACKGROUND

Fuel cells typically include a plurality of layers that facilitate an electrochemical process for generating electricity. There are various challenges associated with operating fuel cells. Managing fluid distribution and moisture content at various locations within a fuel cell assembly under various operating conditions is desirable for achieving satisfactory fuel cell performance. For example, polymer electrolyte membrane fuel cells may experience performance loss under high current density operation conditions because of localized flooding in a catalyst layer or gas diffusion layer, for example.

One approach at addressing this issue has been to incorporate TEFLON® (i.e., polytetrafluoroethylene) in a microporous layer or the gas diffusion layer. The hydrophobic nature of TEFLON® may assist in preventing flooding at the catalyst layer-gas diffusion layer interface. Introducing TEFLON® has the associated drawback of increasing the cost associated with the fuel cell. Additionally, the TEFLON® may tend to fill pores that otherwise are useful for gas transport within the fuel cell. Further, a uniform distribution of TEFLON® is not easily achieved which may still allow for localized flooding.

SUMMARY

An illustrative fuel cell component includes a body that has a plurality of first pores. The first pores have a first pore size. A fluorinated carbon coating is on at least some of the body. The coating establishes a plurality of second pores in a coated portion of the body. The second pores have a second pore size that is smaller than the first pore size.

The fluorinated carbon coating and the second pores are useful for avoiding flooding while still facilitating gas transport through the body.

In an example fuel cell component having one or more features of the fuel cell component of the previous paragraph, the first pore size is at least four times larger than the second pore size.

In an example fuel cell component having one or more features of the fuel cell component of either of the previous paragraphs, the first pore size is about 200 microns and the second pore size is between about 1 and about 50 microns.

In an example fuel cell component having one or more features of the fuel cell component of any of the previous paragraphs, the fluorinated carbon coating comprises an ink composition.

In an example fuel cell component having one or more features of the fuel cell component of any of the previous paragraphs, the ink composition comprises fluorinated carbon CFx2010™ (i.e., fluorinated carbon comprising 11 percent by weight of fluorine), fluorinated carbon CFx3000™ and FC-3283™ solvent (i.e., fluorinated carbon solvent).

In an example fuel cell component having one or more features of the fuel cell component of any of the previous paragraphs, the ink composition comprises about 2 grams of the fluorinated carbon CFx2010™, about 1 gram of the fluorinated carbon CFx3000™, about 57 grams of the FC-3283™ solvent and a carbon to ink ratio of about 5%.

In an example fuel cell component having one or more features of the fuel cell component of any of the previous paragraphs, the ink composition comprises about 0.5 gram of the fluorinated carbon CFx2010™, about 2 grams of the fluorinated carbon CFx3000™, about 31 grams of the FC-3283™ solvent and a carbon to ink ratio of about 7.5%.

In an example fuel cell component having one or more features of the fuel cell component of any of the previous paragraphs, the coating is applied to at least one side of the body.

In an example fuel cell component having one or more features of the fuel cell component of any of the previous paragraphs, the coating is applied to two sides of the body.

In an example fuel cell component having one or more features of the fuel cell component of any of the previous paragraphs, the coating is applied to substantially all of the body.

An illustrative method of making a fuel cell component includes providing a body having a plurality of first pores with a first pore size. A fluorinated carbon coating is applied to at least some of the body for establishing a plurality of second pores in a coated portion of the body. The second pores have a second pore size that is smaller than the first pore size.

In an example method having one or more features of the method of the previous paragraph, the first pore size is at least four times larger than the second pore size.

In an example method having one or more features of the method of any of the previous paragraphs, the first pore size is about 200 microns and the second pore size is between about 1 and about 50 microns.

In an example method having one or more features of the method of any of the previous paragraphs, the applying comprises spraying a fluorinated carbon ink composition on at least some of the body.

In an example method having one or more features of the method of any of the previous paragraphs, the ink composition comprises fluorinated carbon CFx2010™, fluorinated carbon CFx-3000™ and FC-3283™ solvent.

In an example method having one or more features of the method of any of the previous paragraphs, the ink composition comprises about 2 grams of the fluorinated carbon CFx2010™, about 1 gram of the fluorinated carbon CFx3000™, about 57 grams of the FC-3283™ solvent and a carbon to ink ratio of about 5%.

In an example method having one or more features of the method of any of the previous paragraphs, the ink composition comprises about 0.5 gram of the fluorinated carbon CFx2010™, about 2 grams of the fluorinated carbon CFx3000™, about 31 grams of the FC-3283™ solvent and a carbon to ink ratio of about 7.5%.

In an example method having one or more features of the method of any of the previous paragraphs, the applying comprises applying the coating to at least one side of the body.

In an example method having one or more features of the method of any of the previous paragraphs, the applying comprises applying the coating to two sides of the body.

In an example method having one or more features of the method of any of the previous paragraphs, the applying comprises applying the coating to substantially all of the body.

The various features and advantages of at least one disclosed example embodiment will become apparent to those skilled in the art from the following detailed description. The drawings that accompany the detailed description can be briefly described as follows.

DETAILED DESCRIPTION

Figure 1:
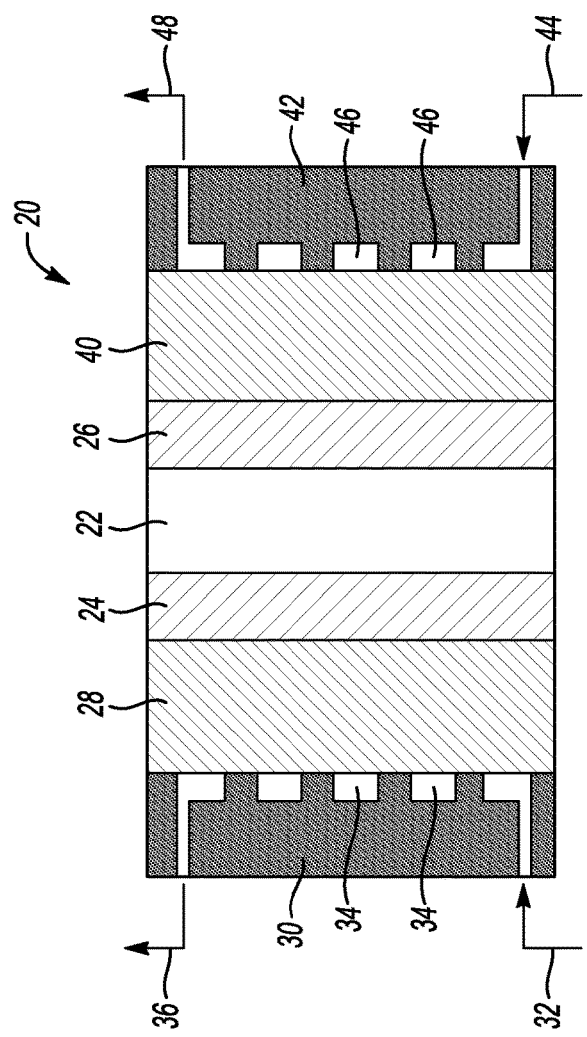
FIG. 1 schematically illustrates selected portions of an example fuel cell assembly designed according to an embodiment of this invention.

FIG. 1 schematically shows a fuel cell assembly 20. This example includes a polymer electrolyte membrane 22 situated between an anode catalyst layer 24 and a cathode catalyst layer 26. The anode catalyst layer 24 is situated next to a gas diffusion layer 28. A reactant flow field plate 30 facilitates directing a reactant, such as hydrogen, toward the gas diffusion layer 28 so that the reactant may reach the catalyst layer 24 for accomplishing the electrochemical reaction within the fuel cell 20. The example reactant flow field plate 30 includes a plurality of channels 34 along which the reactant, such as hydrogen, flows during fuel cell operation.

The cathode catalyst layer 26 is next to another gas diffusion layer 40. A cathode reactant flow field plate 42 is provided next to the gas diffusion layer 40. The cathode flow field plate 42 includes a plurality of channels 46 through which a reactant, such as oxygen, flows so that the reactant may reach the catalyst layer 26 to facilitate the electrochemical reaction in the fuel cell assembly 20.

The manner in which the fuel cell assembly 20 operates is generally known and, therefore, is not described in any further detail here. One way in which the example fuel cell assembly 20 differs from previously known fuel cells is that the gas diffusion layers 28 and 40, or a microporous layer associated with them, include multiple pore sizes established by the manner in which the gas diffusion layers (or microporous layers) are made.

Figure 2:
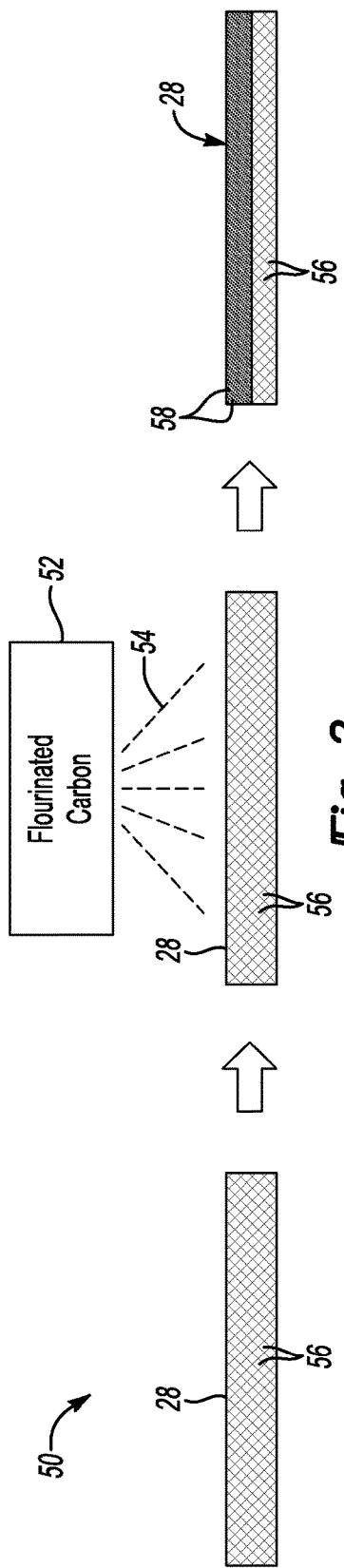
FIG. 2 schematically illustrates an example method of making a fuel cell component according to an embodiment of this invention.

FIG. 2 schematically illustrates an example method 50 of making the gas diffusion layers 28 and 40. In FIG. 2, the gas diffusion layer 28 is considered as an example but the same process may be used for making the gas diffusion layer 40 (or a microporous layer). The gas diffusion layer 28 begins as a body, such as a sheet or film, of a selected gas diffusion layer material. Carbon cloth or a material such as TORAY™ 30 is used in one example.

An applicator 52 applies fluorinated carbon schematically shown at 54 to at least some of the body of the gas diffusion layer 28. In some examples, only one side of the body is coated. In other examples, two oppositely facing surfaces of the body are coated with the fluorinated carbon. In still other examples the fluorinated carbon coats all or essentially all of the body.

Prior to the application of the fluorinated carbon, the body of the gas diffusion layer 28 includes a plurality of first pores schematically shown at 56. The first pores have a first pore size. In one example, the first pore size is approximately 200 microns. After the fluorinated carbon has been applied to at least some of the body of the gas diffusion layer 28, a coated portion includes a plurality of second pores schematically shown at 58. The second pores 58 have a second pore size, which is smaller than the first pore size. In some examples, the second pore size is in the range from about 1 micron to about 50 microns. In some examples, the first pore size is at least four times larger and up to 200 times larger than the second pore size.

Providing two different pore sizes in the gas diffusion layer with fluorinated carbon as the source of the smaller pores facilitates gas transport through the gas diffusion layer and a microporous layer of a fuel cell assembly while reducing or minimizing any flooding at high current density operating conditions. The fluorinated carbon provides a hydrophobic surface on at least some of the coated body. The fluorinated carbon coating is superior to a TEFLON® coating because more pore volume is available for gas transport in the microporous layer and gas diffusion layer. The fluorinated carbon coating is also less expensive than utilizing TEFLON®.

With the example arrangement, liquid water transport can be facilitated by the large surface area of carbon associated with the fluorinated carbon while also allowing for storing water without filling the pores otherwise used for gas transport. The fluorinated carbon coating has the potential for storing or retaining water because of the large surface area associated with the coating and the smaller pore sizes. Retaining water on the fluorinated carbon coated portions of the body may be useful for facilitating desired fuel cell performance in low current density operating conditions.

Figure 3:
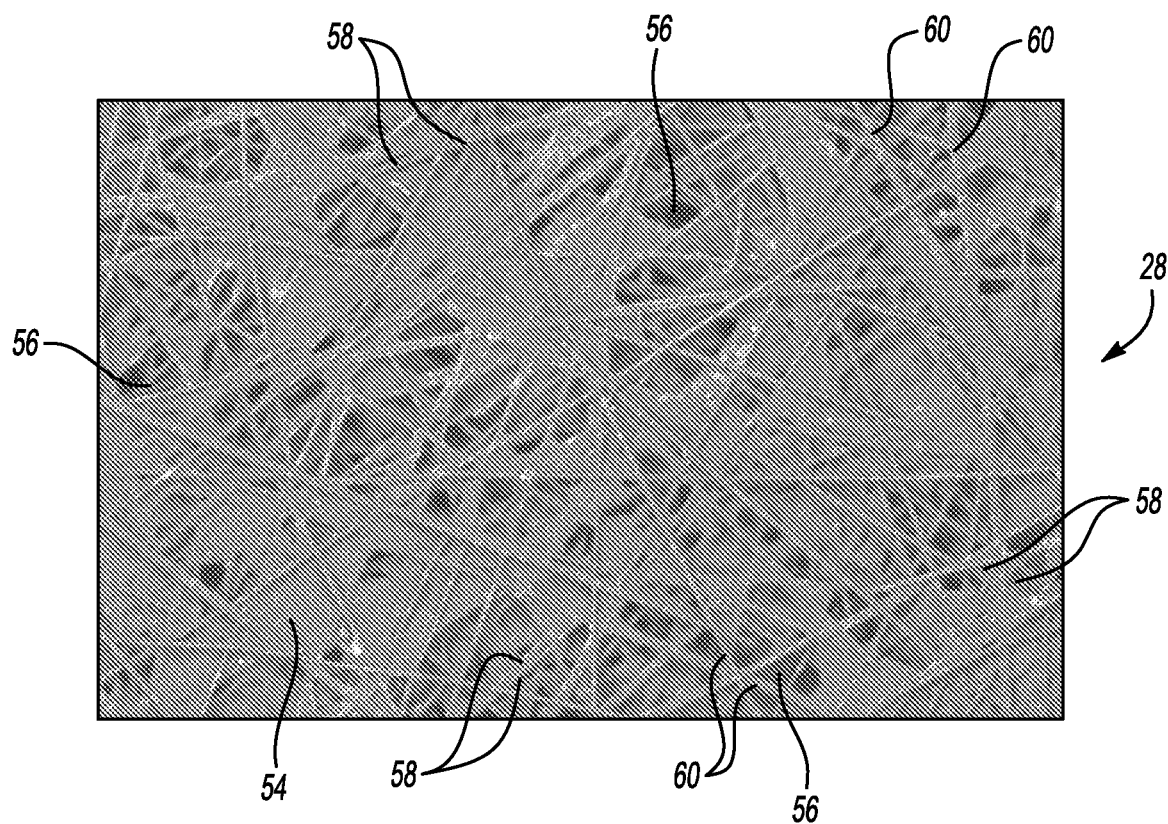
FIG. 3 schematically illustrates selected features of an example fuel cell component designed according to an embodiment of this invention.

FIG. 3 schematically illustrates an example coated portion of a fuel cell component, such as a gas diffusion layer or microporous layer. In this example, the body of the gas diffusion layer 28 includes carbon fibers represented at 60, which establish the first pores 56 having a larger pore size. The fluorinated carbon coating 54 establishes the second pores 58 having the second, smaller pore size.

In one example, the fluorinated carbon coating comprises a microporous layer carbon black ink composition. One example coating includes fluorinated carbon CFx2010™, fluorinated carbon CFx3000™ and FC-3283™ solvent. One particular example includes approximately two grams of the fluorinated carbon CFx-2010™, approximately one gram of the fluorinated carbon CFx3000™, about 57 grams of the FC-3283™ solvent and a carbon-to-ink weight ratio of approximately five percent. Another example fluorinated carbon coating composition includes about 0.5 grams of the fluorinated carbon CFx2010™, about two grams of the fluorinated carbon CFx3000™, about 30.8 grams of the FC-3283™ solvent and a carbon-to-ink weight ratio of about 7.5 percent.

The larger pores combined with the smaller pores effectively establishes a tortuous pathway through the body of the fuel cell component that allows for gas transport while reducing or minimizing the possibility for flooding. The smaller pore sizes establish a vapor barrier that prevents flooding that otherwise might occur through the larger sized first pores. The smaller pores 58 also help with capillary action for liquid management. The high surface area carbon distribution provided by the fluorinated carbon coating combined with the relatively high tortuosity of the pathways through the component provides a useful vapor barrier to prevent water vapor loss during high temperature operation conditions.

Using a rod coating technique for impregnating the component body with the fluorinated carbon coating provides a useful distribution of the first pores 56 and the second pores 58 that does not cause an undesirable gas pressure drop within a fuel cell.

The disclosed example fuel cell component is useful as a gas diffusion layer or microporous layer to facilitate better fuel cell performance under a variety of operating conditions. In particular, higher current conditions will not have flooding otherwise associated with some fuel cell arrangements. Avoiding flooding avoids a reduction in power output and fuel cell performance loss.

The preceding description is illustrative rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell, comprising:
   an anode gas diffusion layer; and
   a cathode gas diffusion layer;
   wherein the anode gas diffusion layer and the cathode gas diffusion layer each include:
   a body comprising a plurality of carbon fibers;
   a plurality of first pores, each of the first pores having a first pore size and a boundary that includes ones of the plurality of carbon fibers;
   a fluorinated carbon coating on the surface of substantially all of the body, the fluorinated carbon coating including a fluorinated carbon ink composition; and
   a plurality of second pores, each of the second pores having a second pore size that is at least four times smaller than the first pore size, and having a boundary that includes at least a portion of the fluorinated carbon coating,
   wherein the ink composition does not include polytetrafluoroethylene, and
   wherein the fluorinated carbon coating applied to the anode gas diffusion layer and the cathode gas diffusion layer is the same.

2. The fuel cell of claim 1, wherein:
   the first pore size is about 200 microns; and
   the second pore size is between about 1 and about 50 microns.

3. The fuel cell of claim 1, wherein the fluorinated carbon ink composition comprises fluorinated carbon and a fluorinated carbon solvent, wherein the fluorinated carbon is present in the ink composition at 5% by weight.

4. The fuel cell of claim 1, wherein the fluorinated carbon ink composition comprises fluorinated carbon and a fluorinated carbon solvent, wherein the fluorinated carbon is present in the ink composition at 7.5% by weight.

5. The fuel cell of claim 1, wherein the body of the gas diffusion layer comprises a carbon cloth.

6. A method of making a fuel cell comprising an anode gas diffusion layer and a cathode gas diffusion layer, the method comprising:

applying a fluorinated carbon coating comprising an ink composition to a surface of substantially all of a body of each of the anode gas diffusion layer and the cathode gas diffusion layer, wherein the body of each of the anode gas diffusion layer and the cathode gas diffusion layer comprises a plurality of carbon fibers and a plurality of first pores, the first pores having a first pore size and a boundary that includes ones of the plurality of carbon fibers, the applying including forming a plurality of second pores in a coated portion of the body, wherein the body retains a portion of the plurality of first pores after the applying, the second pores, the second pores having a boundary that includes at least a portion of the fluorinated carbon coating, and a second pore size that is at least four times smaller than the first pore size, wherein the ink composition does not include polytetrafluoroethylene, and wherein the fluorinated carbon coating applied to the anode gas diffusion layer and the cathode gas diffusion layer is the same.

7. The method of claim 6, wherein
   the first pore size is about 200 microns; and
   the second pore size is between about 1 and about 50 microns.

8. The method of claim 6, wherein the applying comprises spraying the ink composition on the surface of substantially all of the body of each of the anode gas diffusion layer and the cathode gas diffusion layer.

9. The method of claim 6, wherein applying the fluorinated carbon coating comprises spraying or rod coating.

10. The method of claim 6, wherein the fluorinated carbon ink composition comprises fluorinated carbon and a fluorinated carbon solvent, wherein the fluorinated carbon is present in the ink composition at 5% by weight.

11. The method of claim 6, wherein the fluorinated carbon ink composition comprises fluorinated carbon and a fluorinated carbon solvent, wherein the fluorinated carbon is present in the ink composition at 7.5% by weight.

12. The method of claim 6, wherein the body of the gas diffusion layer comprises a carbon cloth.

* * * * *

UNITED STATES PATENT AND TRADEMARK OFFICE
CERTIFICATE OF CORRECTION

| | |
|---|---|
| PATENT NO. | : 11,152,626 B2 |
| APPLICATION NO. | : 15/111151 |
| DATED | : October 19, 2021 |
| INVENTOR(S) | : Siddique Ali Khateeb Razack |

Page 1 of 1

It is certified that error appears in the above-identified patent and that said Letters Patent is hereby corrected as shown below:

In the Claims

<u>Column 6, Claim 6, Lines 12-13:</u>
"after the applying, the second pores, the second pores having a boundary"
Should read:
-- after the applying, the second pores having a boundary --.

Signed and Sealed this
Fourteenth Day of November, 2023

Katherine Kelly Vidal
*Director of the United States Patent and Trademark Office*